US009224365B2

(12) United States Patent
Zhao et al.

(10) Patent No.: US 9,224,365 B2
(45) Date of Patent: Dec. 29, 2015

(54) METHOD AND APPARATUS FOR REDUCING INTERFERENCE AND MOBILE TERMINAL

(71) Applicant: Sony Mobile Communications AB, Lund (SE)

(72) Inventors: Zhenjiang Zhao, Beijing (CN); Feifan Wang, Beijing (CN); Simon Wang, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 14/108,985

(22) Filed: Dec. 17, 2013

(65) Prior Publication Data

US 2014/0218352 A1     Aug. 7, 2014

(30) Foreign Application Priority Data

Feb. 6, 2013    (CN) .......................... 2013 1 0047860

(51) Int. Cl.
    *G09G 5/18*         (2006.01)
    *H04B 15/06*       (2006.01)
    *H04W 52/02*      (2009.01)

(52) U.S. Cl.
    CPC ................. *G09G 5/18* (2013.01); *H04B 15/06* (2013.01); *H04W 52/027* (2013.01); *H04B 2215/065* (2013.01)

(58) Field of Classification Search
CPC ............ G09G 5/18; G09G 2320/0209; G09G 2320/064; G09G 2320/0646; G09G 2330/06; G09G 2370/08; G09G 2370/10; G09G 2370/12; H04B 15/06; H04B 2215/065; H04W 52/027
See application file for complete search history.

(56) References Cited

U.S. PATENT DOCUMENTS

2007/0281620 A1* 12/2007 Rubin et al. ................. 455/63.1
2010/0141613 A1   6/2010 Sonobe
2012/0144224 A1*   6/2012 Machnicki et al. ........... 713/500

FOREIGN PATENT DOCUMENTS

EP        2 037 445 A2     3/2009

OTHER PUBLICATIONS

International Search Report and Written Opinion, corresponding to PCT/IB2014/000082, mailed on May 2, 2014.

* cited by examiner

*Primary Examiner* — Liliana Cerullo
(74) *Attorney, Agent, or Firm* — Renner, Otto, Boisselle & Sklar, LLP.

(57) ABSTRACT

A method and apparatus for reducing interference and a mobile terminal using the method and apparatus. The method includes: selecting a display mode of a pixel, for a frequency falling into a receiving band range of radio communication, according to a corresponding relation between the pixel to be displayed and a strength value of interference induced in the frequency. The present invention may not only further reduce interference brought by the MIPI high-speed data transmission to radio communication receiver, but also have effect on those bands lower than 1 GHZ, lower the requirements on hardware and hence lower hardware cost, and occupy no design space.

13 Claims, 7 Drawing Sheets

| Band | GSM850 | GSM900 | DCS1800 | PCS1900 | GPS | Glonass | Band 1 | Band 2 | Band 3 | Band 4 | Band 5 | Band 7 | Band 8 | Band 17 | Band 20 | WLAN 2.4G | WLAN 5G |
|---|---|---|---|---|---|---|---|---|---|---|---|---|---|---|---|---|---|
| frequency(MHz) | 869-894 | 925-960 | 1805-1880 | 1930-1990 | 1575.42/2M BW | 1597.5-1605.8 | 2110-2170 | 1930-1990 | 1805-1880 | 2110-2155 | 869-894 | 2620-2690 | 925-960 | 734-746 | 791-821 | 2400-2500 | |

Fig. 3

| Fundermental Freq | | 14 | 15 | 16 | 17 | 18 | 19 |
|---|---|---|---|---|---|---|---|
| 53.5 | | 749.00 | 802.50 | 856.00 | 909.50 | 963.00 | 1016.50 |
| GSM850 | | | | | | | |
| EGSM900 | | | | | | | |
| DCS1800 | | | | | | | |
| PCS1900 | | | | | | | |
| Band 1 | | | | | | | |
| Band 2 (PCS1990) | | | | | | | |
| Band 3 (DCS1800) | | | | | | | |
| Band 4 (Sub of Band 1) | | | | | | | |
| Band 5 (GSM850) | | | | | | | |
| Band 7 | | | | | | | |
| Band 8 (EGSM900) | | | | | | | |
| Band 17 | | | | | | | |
| Band 20 | | | *Failed* | | | | |
| GPS | | | | | | | |
| Glonass | | | | | | | |

Fig. 4

METHOD AND APPARATUS FOR REDUCING INTERFERENCE AND MOBILE TERMINAL

CROSS-REFERENCE TO RELATED APPLICATION AND PRIORITY CLAIM

This application claims priority from Chinese patent application No. 20310047860.6, filed Feb. 6, 2013, the entire disclosure of which hereby is incorporated by reference.

TECHNICAL FIELD

The present invention relates to the field of mobile equipment, and in particular to a method and apparatus for reducing interference and mobile terminal.

BACKGROUND ART

Currently in a mobile terminal (for example, a smart mobile phone), very high display resolution and color configuration are provided for better user experiences. To achieve such an object, a mobile industry processor interface (MIPI) is provided.

MIPI is an alliance set up by ARM, Nokia, ST, and TI, etc., with the object to standardize interfaces within a mobile terminal, such as a camera, a display screen interface, and a radio frequency/baseband interface, so as to lower the complexity of design of a mobile phone and increase flexibility of the design. At present, there are a series of intra-mobile phone interface standards, such as camera interface CSI, display screen interface DSI, radio frequency interface DigRF, and microphone/speaker interface SLIMbus, etc. Therefore, manufacturers of mobile terminals may flexibly select different chips and modules as demanded, and it is more quick and convenient for modifying designs and functions.

SUMMARY OF THE INVENTION

It was found by the inventors that MIPI display interface DSI includes 4 data lines and 1 clock line, and the harmonic components produced by signals transmitted at a high speed may fall into the band ranges of radio communication (such as a radio frequency (RF) receiver), which brings interference to the radio communication, and hence the performance of the radio communication is greatly lowered.

In the prior art, hardware methods are generally used to alleviate interference, such adding a common choke or a low-pass filer, etc., or adding a copper sheet or a ferrite absorber, etc. These methods bring few effects to those bands lower than 1 GHZ although they alleviate interference to a certain degree. Furthermore, these methods increase the cost, need certain space (e.g., take up space), and often conflict with the mechanical designs of mobile terminals.

Embodiments embodiments of the present invention provide a method and apparatus for reducing interference and a mobile terminal, with reduced interference of MIPI display to radio communication.

According to an aspect of the embodiments of the present invention, there is provided a method for reducing interference, including:

selecting a display mode of a pixel, for a frequency falling into a receiving band range of radio communication, according to a corresponding relation between the pixel to be displayed and a strength value of interference induced in the frequency.

According to another aspect of the embodiments of the present invention, the method further includes: determining a clock of transmission in an MIPI display interface according to a band range of radio communication.

According to still another aspect of the embodiments of the present invention, the method further includes:

calculating, for a pixel repeatedly displayed in a picture, Fourier coefficient at the frequency of a repeated signal transmitted in a data line of the MIPI display interface; and selecting the display mode of the pixel based on a minimum interference optimization according to the Fourier coefficient.

According to further still another aspect of the embodiments of the present invention, the selecting a display mode of a pixel includes:

selecting a display mode with a minimum strength value of interference, or selecting a display mode which has a strength value of interference less than a predetermined value and is closest to a display mode needing to be displayed.

According to further still another aspect of the embodiments of the present invention, the display mode is RGB (red, green and blue) mode, and the display modes are different as red, green and blue values are different.

According to further still another aspect of the embodiments of the present invention, the red, green and blue values in the display mode are identical, or the red, green and blue values are different from each other.

According to further still another aspect of the embodiments of the present invention, there is provided an apparatus for reducing interference, including:

a selecting unit (also referred to sometimes herein as "selecting module"—the terms "unit" and "module" being used equivalently and interchangeably herein), configured to select a display mode of a pixel for a frequency falling into a receiving band range of radio communication, according to a corresponding relation between the pixel to be displayed and a strength value of interference induced in the frequency.

According to another aspect of the embodiments of the present invention, the apparatus further includes:

a determining unit, configured to determine a clock of transmission in an MIPI display interface according to a band range of radio communication.

According to still another aspect of the embodiments of the present invention, the apparatus further includes:

a calculating unit, configured to calculate, for a pixel repeatedly displayed in a picture, Fourier coefficient at the frequency of a repeated signal transmitted in a data line of the MIPI display interface;

and the selecting unit selects the display mode of the pixel based on a minimum interference optimization according to the Fourier coefficient.

According to further still another aspect of the embodiments of the present invention, the selecting unit is configured to: select a display mode with a minimum strength value of interference, or select a display mode which has a strength value of interference less than a predetermined value and is closest to a display mode needing to be displayed.

According to further still another aspect of the embodiments of the present invention, the display mode is RGB (red, green and blue) mode, and the display modes are different as red, green and blue values are different.

According to further still another aspect of the embodiments of the present invention, the red, green and blue values in the display mode are identical, or the red, green and blue values are different from each other.

According to further still another aspect of the embodiments of the present invention, there is provided a mobile terminal, including the apparatus for reducing interference as described above.

Advantages of the embodiments of the present invention exist in that: for a frequency falling into a band range of radio communication, a display mode of a pixel is selected according to a corresponding relation between the pixel to be displayed and a strength value of interference induced in the frequency. The present invention may not only further reduce interference brought by the MIPI transmission to the radio communication, but also have effect on those bands lower than 1 GHZ, increase no hardware cost, and occupy no design space.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Also, the terms "unit" and "module" may be used equivalently and interchangeably herein. It is understood that in the sense of the description herein such terms have a standard meaning. For example, the terms unit and module may be a hardware component of a mobile phone or other device to which the invention described herein pertains and that operates to provide the features described herein; and/or the terms unit and module may be a piece of software that is part of an overall computer program software, computer code, etc., stored in a memory, or an arrangement of logic circuitry that provides respective operations as described herein.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings:

FIG. 3 shows a schematic diagram of an RX frequency range of a radio receiver;

FIG. 4 is a schematic diagram showing that interference still exists in Band 20 at 802.5 MHZ;

DETAILED DESCRIPTION

The interchangeable terms "electronic apparatus" and "electronic device" include portable radio communication apparatus. The term "portable radio communication apparatus", which hereinafter is referred to as a "mobile terminal", "portable electronic device", or "portable communication device", comprises all apparatuses such as mobile telephones, pagers, communicators, electronic organizers, personal digital assistants (PDAs), smart phones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatus having the function of photographing and sound recording.

Embodiment 1

Figure 1:
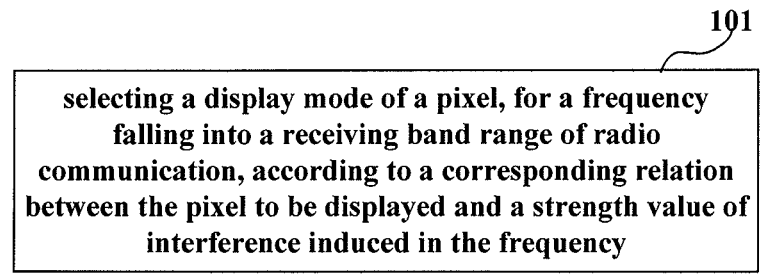
FIG. 1 is a flowchart of the method of an embodiment of the present invention.

An embodiment of the present invention provides a method for reducing interference. FIG. 1 is a flowchart of the method of an embodiment of the present invention. As shown in FIG. 1, the method includes:

Step 101: selecting a display mode of a pixel, for a frequency falling into a receiving band range of radio communication, according to a corresponding relation between the pixel to be displayed and a strength value of interference induced in the frequency.

In this embodiment, a pixel to be displayed in a different display mode may produce a different interference. And for a frequency falling into a receiving band range of radio communication, a strength value of interference induced in the frequency may be reduced by modifying the display mode of the pixel.

Figure 2:
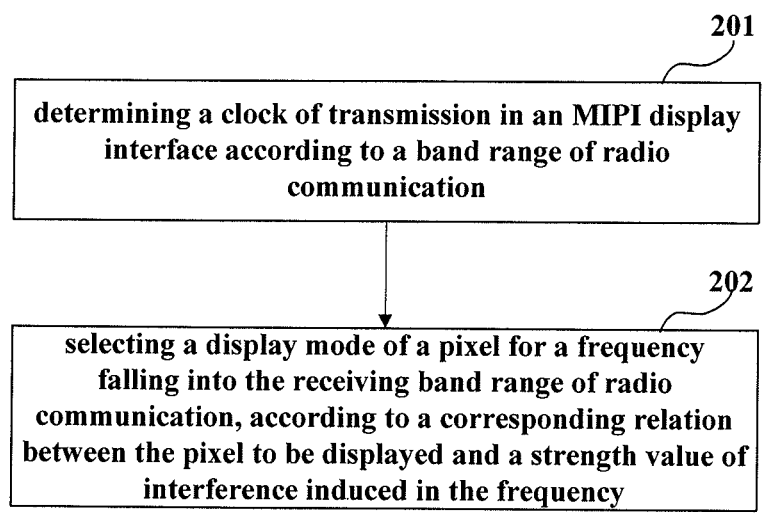
FIG. 2 is another flowchart of the method of an embodiment of the present invention.

FIG. 2 is another flowchart of the method of an embodiment of the present invention. As shown in FIG. 2, the method includes:

Step 201: determining a clock of transmission in an MIPI display interface according to a band range of radio communication, so as to avoid a harmonic frequency induced by the MIPI transmission from falling into a receiving band range of radio communication; and Step 202: selecting a display mode of a pixel for a frequency falling into the receiving band range of radio communication, according to a corresponding relation between the pixel to be displayed and a strength value of interference induced in the frequency.

In this embodiment, the MIPI clock may be allocated according to the band range of radio communication in a mobile terminal. First, the band range of radio communication of the mobile terminal may be determined, and in particular, the band range may be determined according to the parameters of the operator. For example, the band range may be DCS1800, and PCS1900, etc.; and then the MIPI clock may be allocated, so as to avoid harmonic frequencies induced by the MIPI display from falling into the band range of radio communication.

FIG. 3 shows a schematic diagram of an RX frequency range of a radio receiver. As shown in FIG. 3, the radio communication may include a plurality of bands. The MIPI clock may be allocated according to band ranges of radio communication in the mobile terminal, so that the harmonic frequencies induced by the MIPI DSI transmission do not fall into these band ranges.

In this embodiment, the frequency allocation in step 201 may solve the problem of low-frequency interference in most scenarios; however, interference still exists in certain scenarios, such as for GSM850, EGSM900, and 3GPP Band 20, etc.

FIG. 4 is a schematic diagram showing that interference still exists in Band 20 at 802.5 MHZ. As shown in FIG. 4, it is failed at 802.5 MHZ. It should be noted that for the sake of simplicity, only some of the cases are shown.

In this embodiment, for the frequencies falling into the band ranges of radio communication, the display modes of the pixels may be selected according to the strength value of interference induced by display of the pixels at the frequencies. The relation between the pixels to be displayed and the strength value of interference induced in the frequencies may be predetermined, and may also be determined dynamically. The prior art may be referred to for how to determine the corresponding relation between the display of the pixels and the strength value of the interference induced in the frequencies.

In this embodiment, the display mode may be red, green and blue (RGB) mode, and the display modes are different as RGB values are different. The RGB values may be ranged from 0 to 255. For example, the RGB of a certain pixel may be (0, 255, 209). The prior art may be referred to for details of RGB. However, the present invention is not limited thereto, and other display modes may also be used, such as a CMYK mode, an LAB mode, and an HSB mode, etc. Following description is given taking only an RGB mode as an example.

Different display modes of pixels may produce different harmonics, thereby possibly bringing different interference to the radio communication. For example, if a needed display mode (0, 255, 255) is used for a pixel, it is possible that relatively large interference is induced in the frequency falling into the band range of the radio communication; while in another display mode (0, 255, 244), relatively small interference may be induced. Therefore, for some pixels, they may be displayed by using different display modes, thereby reducing interference to the radio communication, without visual effect on people.

In particular implementation, Fourier coefficients at the frequencies may be calculated for a plurality of display modes, where the Fourier coefficient denotes a level of the strength value of interference. Particularly, for all the possible pixels, when they are repeatedly displayed in a picture, Fourier coefficients of repeated signals in the frequencies transmitted in an MIPI DSI data line at this moment may be calculated, and display modes of pixels based on a minimum interference optimization may be selected according to the Fourier coefficients. It should be noted that the use of the Fourier coefficients is an embodiment of the present invention only. However, the present invention is not limited thereto, and other methods may be used for calculating the strength value of interference.

Figure 5A:
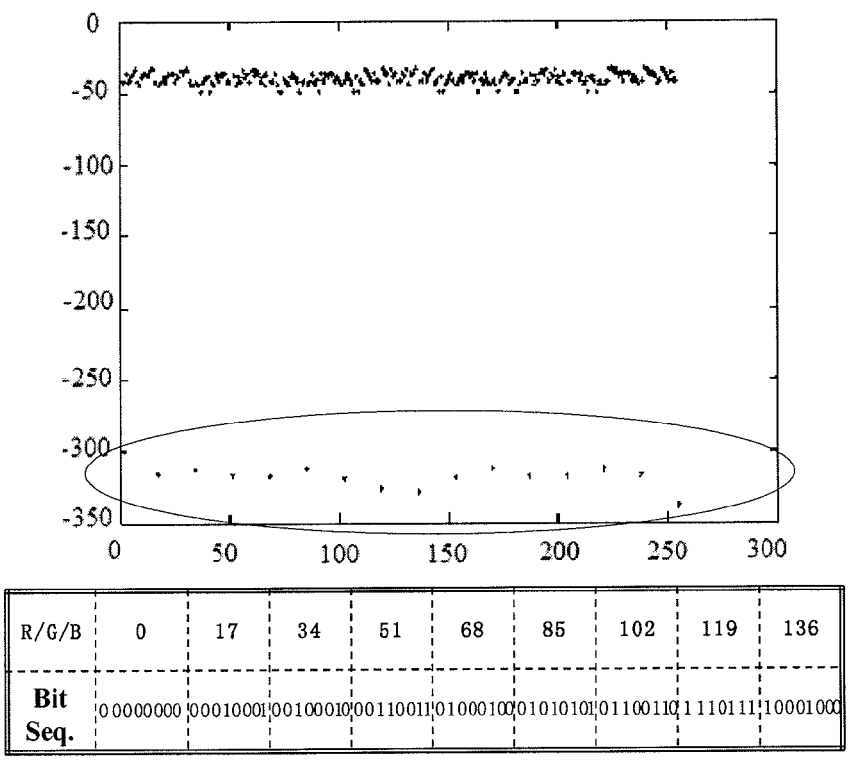
FIGS. 5A and 5B are exemplary diagrams of the Fourier coefficients and display modes of an embodiment of the present invention.
Figure 5B:
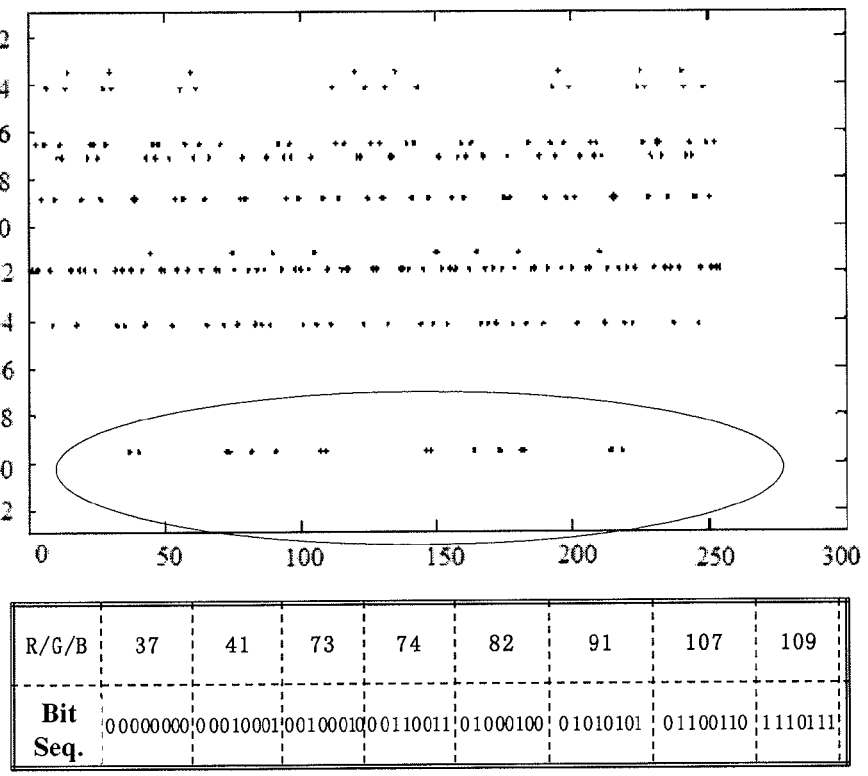

FIGS. 5A and 5B are exemplary diagrams of the Fourier coefficients and display modes of an embodiment of the present invention; wherein the horizontal coordinate is the RGB values, and the vertical coordinate is relative levels (in dB values) of a piece of harmonic interference falling into 3GPP Band 20 of a radio receiver. As shown in FIG. 5A, when the RGB values are equal and are 0, 17, 34, 51, 68, 85, 102, 119, 136, . . . , the strength value of interference may be between −250 and −350 dB (which may actually be infinitesimal and are caused by a calculation error). As shown in FIG. 5B, when the RGB values are equal and are 37, 41, 73, 74, 82, 91, 107, 109, . . . , the strength value of interference may be between −48 and −50 dB.

In this embodiment, in step 101 or 202, the selecting a display mode of a pixel according to a strength value of interference induced in the frequency when the pixel is displayed may in particular include: selecting the display mode with a minimum strength value of interference, or selecting a display mode which has a strength value of interference less than a predetermined value and the display mode is closest to a display mode needing to be displayed.

For example, in a displayed picture, the RGB values of an original pixel needing to be displayed are (92, 92, 92), and the interference in this display mode to the radio communication is −36.5 dB; for RGB values (85, 85, 85), the interference in this display mode induced in this receiving band is −300 dB; and for RGB values (91, 91, 91), the interference in this display mode induced in this receiving band is −49.5 dB. Therefore, the display mode (85, 85, 85) with a minimum strength value of interference may be selected for the pixel, or the display mode (91, 91, 91) which produce interference of relatively small strength (such as less than a threshold value −45 dB) and has a higher color similarity.

It should be noted that the above description is given only taking that the RGB values in a display mode are identical as an example. However, the present invention is not limited thereto, and the RGB values may be different from each other. And at the same time, in the consideration of an interference minimization target, a plurality of receiving bands and a plurality of MIPI DSI data harmonic frequencies in these bands may be analyzed simultaneously. Based on this, the compromised pixel RGB values with all the interference in these harmonic frequencies being not too intense may be determined. A particular manner of implementation may be determined as actually required.

It can be seen from the above embodiment that: a clock for the MIPI DSI transmission is determined according to the band range of the radio communication; and for frequency falling into the band range of radio communication, a display mode of a pixel is selected according to the strength value of interference induced by display of the pixel. The invention may not only further reduce interference brought by the MIPI transmission to the radio communication, but also have obvious effect on those bands lower than 1 GHZ, increase no hardware cost, and occupy no design space.

Embodiment 2

An embodiment of the present invention provides an apparatus for reducing interference, which corresponds to the method of the above embodiment, and the identical parts shall not be described any further.

Figure 6:
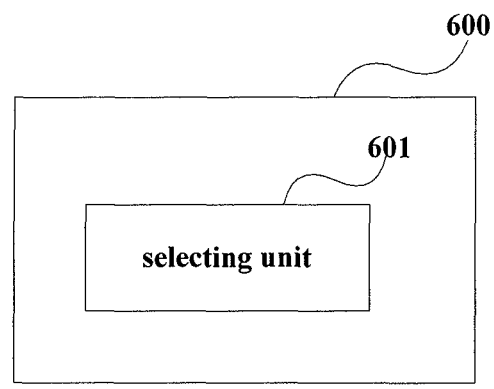
FIG. 6 is a schematic diagram of the construction of the apparatus for reducing interference of an embodiment of the present invention.

FIG. 6 is a schematic diagram of the construction of the apparatus for reducing interference of the embodiment of the present invention. As shown in FIG. 6, the apparatus 600 includes: a selecting unit (also referred to as module, as is mentioned above) 601. The selecting unit 601 is configured to select a display mode of a pixel for a frequency falling into a receiving band range of radio communication, according to a corresponding relation between the pixel to be displayed and a strength value of interference induced in the frequency.

Figure 7:
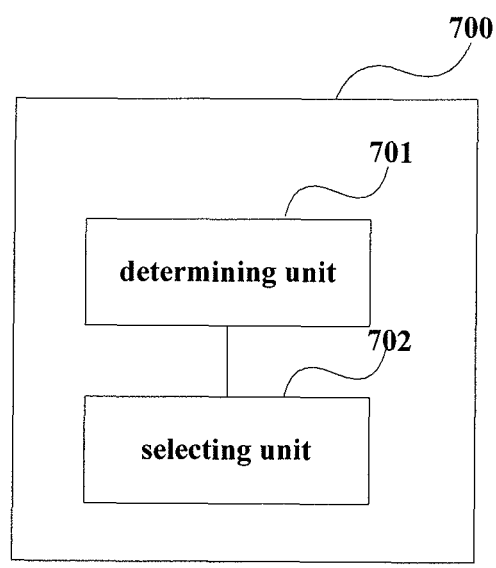
FIG. 7 is another schematic diagram of the construction of the apparatus for reducing interference of an embodiment of the present invention.

FIG. 7 is another schematic diagram of the construction of the apparatus for reducing interference of the embodiment of the present invention. As shown in FIG. 7, the apparatus 700 includes: a determining unit 701 and a selecting unit 702.

The determining unit 701 is configured to determine a clock of transmission in an MIPI display interface according to a band range of radio communication, so as to avoid a harmonic frequency induced by the MIPI display from falling into a receiving band range of radio communication; and the selecting unit 702 is configured to select a display mode of a pixel for a frequency falling into the receiving band range of radio communication, according to a corresponding relation between the pixel to be displayed and a strength value of interference induced in the frequency.

Figure 8:
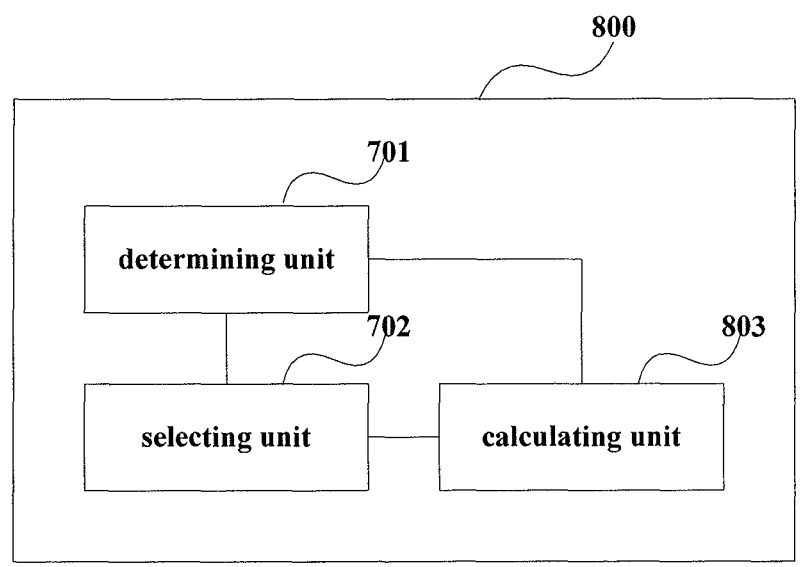
FIG. 8 is still another schematic diagram of the construction of the apparatus for reducing interference of an embodiment of the present invention.

FIG. 8 is still another schematic diagram of the construction of the apparatus for reducing interference of the embodiment of the present invention. As shown in FIG. 8, the apparatus 800 includes: a determining unit 701 and a selecting unit 702 as described above.

As shown in FIG. 8, the apparatus 800 may further include a calculating unit (or module) 803. The calculating unit 803 is configured to calculate, for a pixel repeatedly displayed in a picture, Fourier coefficient of a repeated signal in the frequency transmitted in a data line of the MIPI display interface; and the selecting unit 702 selects the display mode of the pixel based on a minimum interference optimization according to the Fourier coefficient.

In particular implementation, the selecting unit 601 or the selecting unit 702 is configured to: select a display mode with a minimum strength value of interference, or select a display mode which has a strength value of interference less than a predetermined value and is closest to a display mode needing to be displayed. However, the present invention is not limited thereto, and the selection may be performed as actually required.

In this embodiment, the display mode may be RGB modes, and the display modes are different as RGB values are different. The RGB values in the display modes may be identical, or the RGB values are different from each other.

It can be seen from the above embodiment that: a clock for the MIPI display interface transmission is determined according to the band range of the radio communication; and for a frequency falling into a band range of radio communication, a display mode of a pixel is selected according to a strength value of interference induced by display of the pixel. The invention may not only further reduce interference brought by the MIPI transmission to the radio communication, but also have effect on those bands lower than 1 GHZ, increase no hardware cost, and occupy no design space.

Embodiment 3

An embodiment of the present invention provides a mobile terminal, includes the apparatus for reducing interference as described in Embodiment 2.

Figure 9:
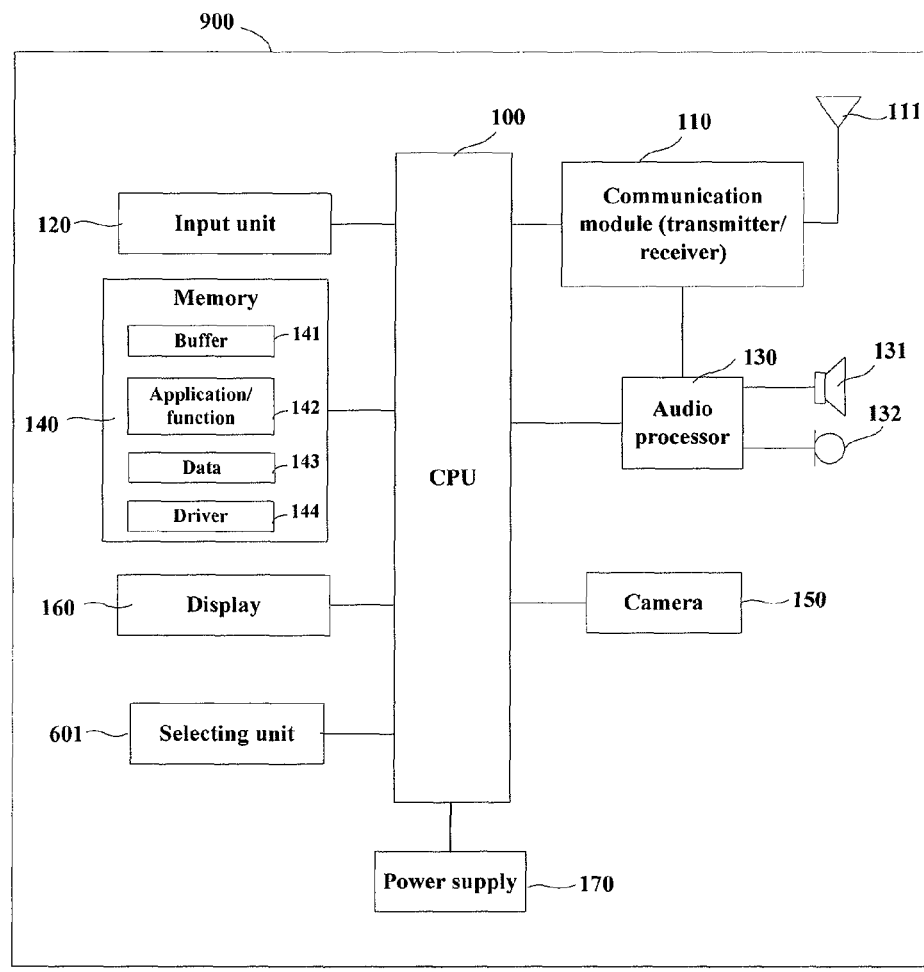
FIG. 9 is block diagram of the systematic construction of the mobile terminal of an embodiment of the present invention.

FIG. 9 is block diagram of the systematic construction of a mobile terminal 900 of the embodiment of the present invention, which includes the selecting unit 601 as described above. As shown in FIG. 9, the selecting unit 601 may be connected to a CPU 100. It should be noted that this diagram is illustrative only, and structures of other types may also be used to supplement or replace this structure, so as to implement telecommunications functions or other functions.

As shown in FIG. 9, the mobile terminal 900 may further include a CPU 100, a communication module 110, an input unit 120, an audio processing unit 130, a memory 140, a camera 150, a display 160, and a power supply 170.

The CPU 100 (also referred to as a controller or an operational control, which includes a microprocessor or other processing devices and/or logic devices) receives input and controls each part and operation of the mobile terminal 900. The input unit 120 provides input to the CPU 100. The input unit 120 may be for example a key or touch input device. The camera 150 is used to take image data and provide the taken image data to the CPU 100 for use in a conventional manner, for example, for storage, and transmission, etc.

The power supply 170 is used to supply power to the mobile terminal 900. The display 160 is used to display the objects of display, such as images, and characters, etc. The display may be for example an LCD display, but it is not limited thereto.

The memory 140 is coupled to the CPU 100. The memory 140 may be a solid state memory, such as a read-only memory (ROM), a random access memory (RAM), and a SIM card, etc., and may also be such a memory that stores information when the power is interrupted, may be optionally erased and provided with more data. Examples of such a memory are sometimes referred to as an EPROM, etc. The memory 140 may also be certain other types of devices. The memory 140 includes a buffer memory 141 (sometimes referred to as a buffer). The memory 140 may include an application/function storing portion 142 used to store application programs and function programs, or to execute the flow of the operation of the mobile terminal 900 via the CPU 100.

The memory 140 may further include a data storing portion 143 used to store data, such as a contact person, digital data, pictures, voices and/or any other data used by an electronic apparatus. A driver storing portion 144 of the memory 140 may include various types of drivers of the electronic apparatus for the communication function and/or for executing other functions (such as application of message transmission, and application of directory, etc.).

The communication module 110 is a transmitter/receiver 110 transmitting and receiving signals via an antenna 111. The communication module (transmitter/receiver) 110 is coupled to the CPU 100 to provide input signals and receive output signals, this being similar to the case in a conventional mobile phone.

A plurality of communication modules 110 may be provided in the same electronic apparatus for various communication technologies, such a cellular network module, a Bluetooth module, and/or wireless local network module, etc. The communication module (transmitter/receiver) 110 is also coupled to a loudspeaker 131 and a microphone 132 via the audio processing unit 130, for providing audio output via the loudspeaker 131 and receiving the audio input from the microphone 132, thereby achieving common telecommunications function. The audio processing unit 130 may include any suitable buffers, decoders, and amplifiers, etc. The audio processing unit 130 is further coupled to the CPU 100, thereby enabling the recording of voices in this device via the microphone 132 and playing the voices stored in this device via the loudspeaker 131.

An embodiment of the present invention further provides a computer-readable program, wherein when the program is executed in a mobile terminal, the program enables the computer to carry out the method for reducing interference as described in Embodiment 1 in the mobile terminal.

An embodiment of the present invention further provides a storage medium in which a computer-readable program is stored, wherein the computer-readable program enables the computer to carry out the method for reducing interference as described in Embodiment 1 in a mobile terminal.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

The invention claimed is:

1. A method for reducing interference in a device including a display having a plurality of pixels, the method comprising:
selecting a display mode of a pixel of the plurality of pixels independent of a display mode of another pixel of the plurality of pixels, for a frequency falling into a receiving band range of radio communication, according to a corresponding relation between the pixel to be displayed and a strength value of interference induced in the frequency, wherein the display mode of the pixel corresponds to a color value of the pixel.

2. The method according to claim 1, wherein the method further comprises: determining a clock of transmission in an MIPI display interface according to a band range of radio communication.

3. The method according to claim 2, wherein the method further comprises:
calculating, for a pixel repeatedly displayed in a picture, Fourier coefficient at the frequency of a repeated signal transmitted in a data line of the MIPI display interface; and
selecting the display mode of the pixel based on a minimum interference optimization according to the Fourier coefficient.

4. The method according to claim 1, wherein the selecting a display mode of a pixel comprises:
selecting a display mode with a minimum strength value of interference, or selecting a display mode which has a strength value of interference less than a predetermined value and is closest to a display mode needing to be displayed.

5. The method according to claim 1, wherein the display mode is RGB (red, green and blue) mode, and each of red, blue and green colors is represented by a red, green and blue value, respectively, and wherein each red, blue and green value corresponds to a different display mode.

6. The method according to claim 5, wherein the red, green and blue values in the display mode are identical, or the red, green and blue values are different from each other.

7. A mobile terminal, comprising an apparatus configured to execute the method for reducing interference as claimed in claim 1.

8. An apparatus for reducing interference in a device including a display having a plurality of pixels, the apparatus comprising:
  a selecting unit configured to select a display mode of a pixel of the plurality of pixels independent of a display mode of another pixel of the plurality of pixels for a frequency falling into a receiving band range of radio communication, according to a corresponding relation between the pixel to be displayed and a strength value of interference induced in the frequency, wherein the display mode of the pixel corresponds to a color value of the pixel.

9. The apparatus according to claim 8, wherein the apparatus further comprises:
  a determining unit, configured to determine a clock of transmission in an MIPI display interface according to a band range of radio communication.

10. The apparatus according to claim 8, wherein the selecting unit is configured to: select a display mode with a minimum strength value of interference, or select a display mode which has a strength value of interference less than a predetermined value and is closest to a display mode needing to be displayed.

11. The apparatus according to claim 8, wherein the display mode is RGB (red, green and blue) mode, and each of red, blue and green colors is represented by a red, green and blue value, respectively, and wherein each red, blue and green value corresponds to a different display mode.

12. The apparatus according to claim 11, wherein the red, green and blue values in the display mode are identical, or the red, green and blue values are different from each other.

13. An apparatus for reducing interference, comprising:
  a selecting unit configured to select a display mode of a pixel independent of a display mode of another pixel for a frequency falling into a receiving band range of radio communication, according to a corresponding relation between the pixel to be displayed and a strength value of interference induced in the frequency
  a determining unit, configured to determine a clock of transmission in an MIPI display interface according to a band range of radio communication
  a calculating unit, configured to calculate, for a pixel repeatedly displayed in a picture, Fourier coefficient at the frequency of a repeated signal transmitted in a data line of the MIPI display interface;
  and the selecting unit selects the display mode of the pixel based on a minimum interference optimization according to the Fourier coefficient.

* * * * *